(12) United States Patent
Stévenne

(10) Patent No.: US 8,595,264 B2
(45) Date of Patent: Nov. 26, 2013

(54) EVENT PROCESSING BASED ON META-RELATIONSHIP DEFINITION

(75) Inventor: Jean-Marc Stévenne, Boncelles (BE)

(73) Assignee: BM Software, Inc., Houston, TX (US)

( * ) Notice: Subject to any disclaimer, the term of this patent is extended or adjusted under 35 U.S.C. 154(b) by 0 days.

(21) Appl. No.: 13/174,736

(22) Filed: Jun. 30, 2011

(65) Prior Publication Data

US 2013/0006987 A1    Jan. 3, 2013

(51) Int. Cl.
*G06F 17/00*    (2006.01)

(52) U.S. Cl.
USPC .......................................... 707/802

(58) Field of Classification Search
USPC .......................... 707/737, 802, 806, 999.102
See application file for complete search history.

(56) References Cited

U.S. PATENT DOCUMENTS

| | | | | |
|---|---|---|---|---|
| 6,101,186 A * | 8/2000 | Craig | | 370/394 |
| 2003/0105738 A1 * | 6/2003 | Taketa et al. | | 707/1 |
| 2003/0204643 A1 * | 10/2003 | Yamauchi | | 709/313 |
| 2005/0076059 A1 * | 4/2005 | Nomura et al. | | 707/104.1 |
| 2005/0138111 A1 * | 6/2005 | Aton et al. | | 709/201 |
| 2005/0278052 A1 * | 12/2005 | Bett et al. | | 700/108 |
| 2005/0278708 A1 * | 12/2005 | Zhao et al. | | 717/136 |
| 2005/0283680 A1 * | 12/2005 | Kobayashi et al. | | 714/39 |
| 2009/0043802 A1 * | 2/2009 | Appel | | 707/102 |
| 2009/0281838 A1 * | 11/2009 | Lynn et al. | | 705/3 |
| 2009/0281839 A1 * | 11/2009 | Lynn et al. | | 705/3 |
| 2010/0138370 A1 * | 6/2010 | Wu et al. | | 706/12 |
| 2011/0197207 A1 * | 8/2011 | Bhargava | | 719/318 |
| 2011/0246835 A1 * | 10/2011 | Hasegawa et al. | | 714/39 |
| 2011/0314481 A1 * | 12/2011 | Bernstein et al. | | 719/318 |
| 2012/0254088 A9 * | 10/2012 | Kass et al. | | 706/46 |

* cited by examiner

*Primary Examiner* — Mohammed R Uddin
(74) *Attorney, Agent, or Firm* — Brake Hughes Bellermann LLP

(57) ABSTRACT

According to an example implementation, a non-transitory computer-readable storage medium is provided that includes computer-readable instructions stored thereon that, when executed, are configured to cause a processor to at least: store a relationship definition including one or more selectors identifying events participating in the relationship and one or more constraints between the events, at least one of the constraints expressed in terms of one or more relationship parameters. The instructions further cause the processor to receive one or more events, evaluate the received events against the one or more selectors, create a candidate relationship when the relationship parameters have been defined based on receiving one or more events that match one or more of the selectors, and convert the candidate relationship to a relationship instance when a minimum number of events matching each of the selectors are received.

16 Claims, 4 Drawing Sheets

US 8,595,264 B2

EVENT PROCESSING BASED ON META-RELATIONSHIP DEFINITION

TECHNICAL FIELD

This description relates to event processing.

BACKGROUND

A variety of events may occur. These events may relate to a wide variety of areas or topics. Computers allow many different types of processes to be automated. However, in many cases, tracking or identifying various relationships between events has, at least in part, included a manual process, which can be inexact and be very time consuming.

SUMMARY

According to an example implementation, a non-transitory computer-readable storage medium is provided that includes computer-readable instructions stored thereon that, when executed, are configured to cause a processor to at least: store a relationship definition including one or more selectors identifying events participating in the relationship and one or more constraints between the events, at least one of the constraints expressed in terms of one or more relationship parameters. The instructions further cause the processor to receive one or more events, evaluate the received events against the one or more selectors, create a candidate relationship when the relationship parameters have been defined based on receiving one or more events that match one or more of the selectors, and convert the candidate relationship to a relationship instance when a minimum number of events matching each of the selectors are received.

According to another example implementation, a computer implemented method is provided. The method includes storing a relationship definition including one or more selectors identifying events participating in the relationship and one or more constraints between the events, at least one of the constraints expressed in terms of one or more relationship parameters. The method further includes receiving one or more events, evaluating the received events against the one or more selectors, creating a candidate relationship when the relationship parameters have been defined based on receiving one or more events that match one or more of the selectors, and converting the candidate relationship to a relationship instance when a minimum number of events matching each of the selectors are received.

According to another example implementation, a computer system is provided that includes instructions recorded on a computer-readable storage medium and readable by at least one processor. The system includes meta-relationship logic configured to cause the at least one processor to store a relationship definition including one or more selectors identifying events participating in the relationship and one or more constraints between the events, at least one of the constraints expressed in terms of one or more relationship parameters. The system further includes an event receiver configured to receive one or more events, an event processing logic configured to evaluate or compare the received events against the one or more selectors, a relationship manager configured to cause the at least one processor to create a candidate relationship when the relationship parameters have been defined based on receiving one or more events that match one or more of the selectors, and wherein the relationship manager is further configured to cause the at least one processor to convert the candidate relationship to a relationship instance when a minimum number of events matching each of the selectors have been received.

The details of one or more implementations are set forth in the accompa-nying drawings and the description below. Other features will be apparent from the description and drawings, and from the claims.

DETAILED DESCRIPTION

Figure 1:
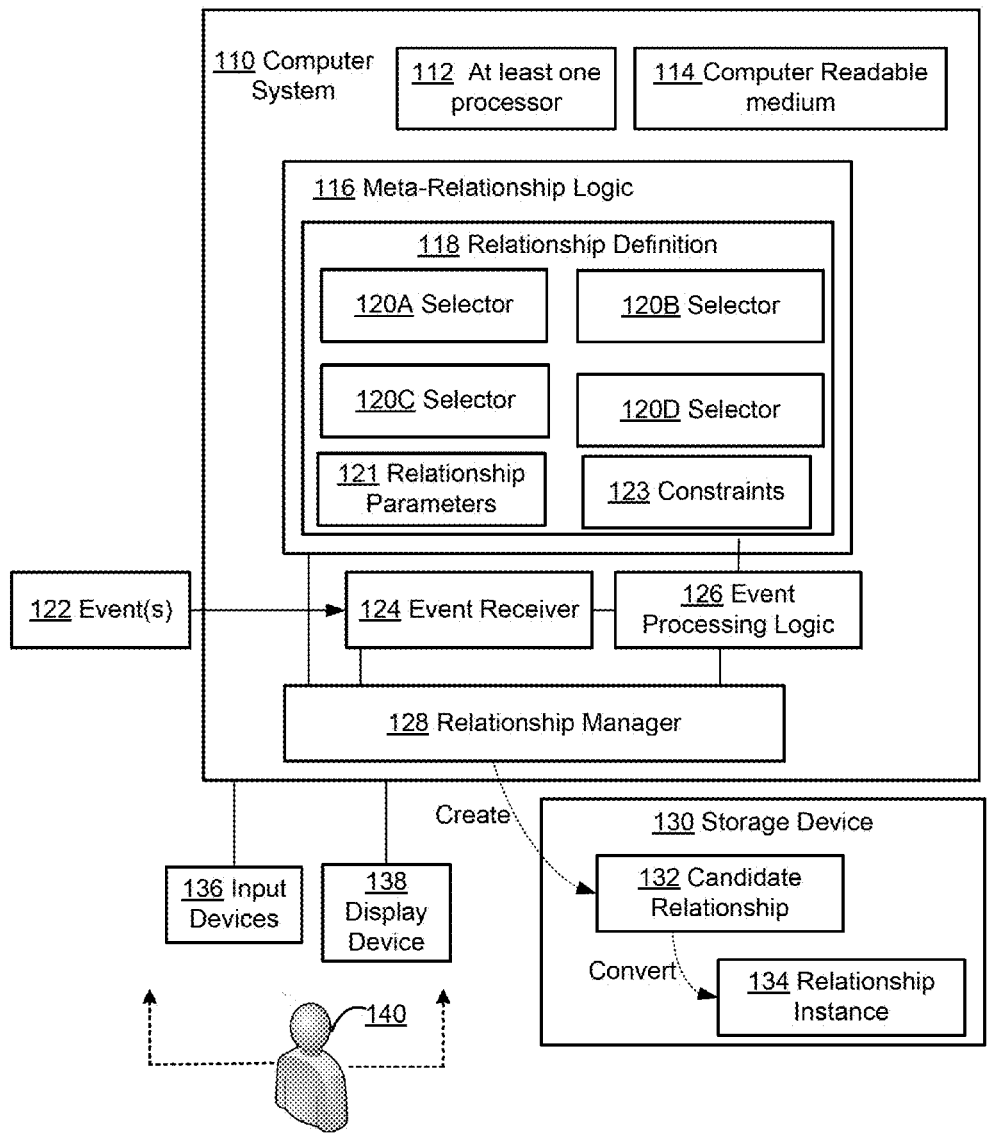
FIG. 1 is a block diagram of a computer system 110 processing events based on a relationship definition.

FIG. 1 is a block diagram of a computer system 110 processing events based on a relationship definition. Computer system 110 may include at least one processor 112 (such as a microprocessor, for example) for executing software or instructions, or providing overall control for computer system 110. Computer system 110 may also include a non-transitory computer readable medium 114 for storing computer instructions, data or other information. A meta-relationship logic 116 is provided, and may include a relationship definition 118 of one or more generic relationships. Each relationship definition 118 may include a set of relationship parameters 121 and a set of one or more event selectors (or simply selectors) 120, such as selectors 120A, 120B, 120C and 120D. Selectors 120 identify events participating in the relationship and one or more constraints 123 between the events for the relationship. One or more of the constraints 123 may be expressed in terms of one or more of the relationship parameters 121.

An event receiver 124 may receive one or more events 122. Events may include any type of events. In an example implementation, the events may be any computer-related events, such as a disk event, e.g., disk usage exceeding 90%, or disk latency exceeding a threshold value (e.g., greater than 100 ms), or a memory event, e.g., memory usage exceeds 85%. These are merely examples, and any events may be used, such as events that may provide information to be tracked, analyzed or compared, or used to make decisions, or to be used to develop solutions to problems, for example.

Event processing logic 126 may process received events 122. For example, event processing logic 126 may evaluate each of the received events against the one or more selectors (e.g., compare each received event against the one or more selectors) to determine if the received event meets or matches the selector's constraints between the events. A relationship manager 128 may manage various tasks or functions related to relationships, such as, for example, creating candidate relationships 132, converting each (or one or more) candidate relationship 132 to a relationship instance 134, adding received events 122 to an existing candidate relationship or relationship instance, and other functions related to the management of relationships.

In an example implementation, a candidate relationship 132 may be created by relationship manager 128 when all of the relationship parameters have been defined based on receiving one or more events that match one or more of the selectors 120 for the relationship. Relationship manager 128 may also convert a candidate relationship 132 to a relationship instance 134 when a minimum number of events matching each of the selectors 120 have been received.

In an example implementation, candidate relationship(s) 132 and relationship instances 134 may be stored in storage device 130, which may be part of computer system 110. Storage device 130 may include, for example, a hard disk drive, memory, attached storage, a Universal Serial Bus (USB) storage device, Random Access Memory (RAM), Read Only Memory (ROM), or other storage device.

One or more input devices 136 may be provided which may include, for example, a keyboard, mouse, or other pointing device, and/or other input devices, Input devices 136 may be used by a user 140 to create, input, edit, delete, or select the meta-relationship logic 116, such as uploading or creating or editing the relationship definition 118, including, for instance, creating or editing selectors 120, relationship parameters 121 and/or constraints 123, for example. A display device 138 may be provided to allow a user 140 to view representations of the relationship definition 118, for example, and other information.

According to an example embodiment, a meta-relationship may be an object defining in a declarative way (e.g., as opposed to a programmatic way) a class of event relationships which may be referred to as generic-relationships. The meta-relationship (or simply relationship) may be a policy that does not require (additional) rule writing and can dynamically be created/modified/deleted. Rather than requiring a database lookup, relationships may be created on the fly, e.g., based upon events as the events are received. The meta-relationship object can be used as a documentation of the relationships. An event can participate to various relationships. Each of these relationships refers to a meta-relationship object that documents the meaning of the relationship and the role of each event inside this relationship. Candidate relationships and relationship instances may be created based on the meta-relationship.

A meta-relationship may hold or include a definition of a generic relationship(s). In order to be generic, each meta-relationship can contain a set of relationship parameters (or variables) and event selectors with one or more conditions or constraints referring to these variables. Each candidate relationship or relationship instance includes a set of the relationship parameters (or relationship variables). According to an example embodiment, these relationship parameters or variables are automatically instantiated by (or based upon) one or more received or incoming events. These relationship parameters may serve as a link between the various events participating in the generic relationships, e.g., the relationship parameters may be shared and/or defined by the events of the relationship.

In an example embodiment, a meta-relationship (or simply a relationship) may include one or more of items 1)-11), listed below, for example:

1) A name that uniquely identifies the type of relationship.

2) One or more relationship parameters (or relationship variables).

3) A description of the relationship, where the description may be parameterized, or may include one or more relationship parameters, or data or values specific to the relationship.

4) A list of event selectors that identify the events participating in a relationship. These selectors may refer to the relationship parameters. It is possible to specify constraints between the related events by adding constraints in the selector that refer to the same relationship parameter(s). In an example implementation, a candidate relationship is created when all relationship parameters have been defined (or established) based on receipt of one or more events that match at least one of the selectors.

5) A list of event roles corresponding to the list of selectors that describe the role (such as "cause", "effect", . . . ) of each type of event inside the relationship.

6) A minimum number of events matching each selector (by default 1), before the candidate relationship will be converted to a relationship instance (instantiating the relationship instance).

7) A maximum number of events matching each selector (by default 1). After the maximum number of events for a selector has been reached, further events of this type will not be added to this candidate relationship or relationship instance, but will be added to a newly created (or another) candidate relationship or relationship instance. It is possible to specify an unlimited number of events.

8) One or more additional triggering conditions for instantiating the relationship, e.g., causing a candidate relationship to be converted to a relationship instance. (triggering conditions can refer to the number of instances of each kind of events, the value of the relationship parameters or the severity/status of the events, or other conditions, for example).

9) A time constraint(s) for one or more selectors: Each selector may include a time constraint, which may be a time limit with respect to the reception or occurrence of another event in the relationship, e.g., disk event or memory event must be received within x seconds of receipt of a configuration change event (e.g., for these events to be related or correlated).

10) A time window (optional): every event, to be added to a candidate relationship or relationship instance, should be contained in this time window (or interval). Events outside of this time window may be removed from a candidate relationship, or removed from a pool of events that may be added to future candidate relationships. For example, a time window of 1 hour may be used. When an age of an event is greater than the time window (e.g., older than 1 hour based on its time stamp), it may be removed from any candidate relationship, and is removed from a pool of events such that it may not be added to any other candidate relationships or relationship instances. The time window may provide a technique to remove stale (older than the time window, e.g., 1 hour) events from candidate relationships or to prevent stale events from being added to a candidate relationship.

11) An optional aggregation event definition that will be used to generate an event when the relationship is instantiated, e.g., such as sending a notification of the existence of the relationship instance, a (e.g., parameterized) description of the relationship, a list of the events added to the relationship instance, and other information.

Identifying complex problems and relationships from different events can be challenging. According to an example embodiment, it may be useful to take into account time constraints between these events to avoid generating false alerts.

In one example embodiment, different medical events may be received (or detected) by computer system 110 and compared to selectors for this medical relationship. When all (or a required number) of the relationship parameters 121 have been established or defined based on received events 122, a candidate relationship 132 may be created. The relationship manager 128 may convert the candidate relationship 132 to a relationship instance 134 when a minimum number of events matching each of the selectors for the relationship (or meta-relationship) are received.

As one illustrative example, combining events, or recognizing patterns of related events for a medical relationship may be used to diagnose disease, according to an illustrative example. Each symptom of a patient may be an event that is detected or received by event receiver 124. For example, each symptom of the patient may very well be benign when appearing in isolation but when a set of (or multiple) symptoms arrive within a time constraint (e.g., within two weeks of each other) they might indicate a serious problem. For example a slightly higher glucose level revealed by a blood test can usually be disregarded. However if this slight anomaly is detected several times and in combination one or several of the following symptoms is also observed it may likely indicate type 2 diabetes, for example: being thirsty a lot of the time; tiredness; weight loss; eye problems which can affect vision (due to damage to the small arteries of the retina at the back of the eye); foot problems (due to poor circulation and nerve damage).

According to an example embodiment, a candidate relationship for this medical relationship may be created, and then converted to a relationship instance when a minimum number of events for each selector has been received or detected. This allows a diagnosis, via computer system 110, to take into account several different symptoms, the number of time they occurs and the period over which these symptoms have been collected to determine the seriousness and necessary (or suggested) treatment. Usually there is no need to wait for every symptom before taking pro active actions. Even after the relationship instance exists, further symptoms (events) that meet the selectors for the medical relationship may be added to the relationship, and may trigger a change of treatment (a change in a resulting action, or a change in the action performed in response to creation of the relationship instance and/or further events added to the relationship instance). This medical relationship example described above is merely one illustrative example, and many other types of events and relationships may be used.

In an example implementation, the computer system 110, including the event processing logic 126 and relationship manager 128 acts on queues of related events (e.g., which may include events that are correlated by certain criteria or constraints and/or by their occurrence time). When these queues of events match a certain pattern (e.g., matching constraints of selectors 120 such that a minimum number of events for each selector has been received or detected), the relationship manager 128 may create a diagnostic by converting the candidate relationship to a relationship instance 134, which instantiates a relationship between these events. At that time, further actions can be triggered automatically. For example, more data may be fetched or obtained, or a corrective action may be performed. In the medical example, the further actions that may be triggered may include, for example, sending a message to notify medical personnel (e.g., nurse, doctor, testing company) or others (e.g., patient) of the existence of the medical relationship/possible diagnosis, and an indication of one or more actions to be performed (or at least considered), e.g., a prescription of a treatment or additional tests for the disease/problem, etc. Once a relationship has been instantiated based on its initial events, other new events may be added to this relationship and this may trigger new actions, e.g., new symptoms may result in new or revised actions, or new or revised treatment(s) (or suggested treatment) for the patient. A message may be sent to personnel to identify the existence of the relationship, a description of the relationship, a list of symptoms/events that were received, and possibly a suggested or prescribed treatment or actions that should/may be performed based on the existence of the relationship. This medical example is merely an example, and many other examples or applications may be used.

More generally, according to an example implementation, meta-relationship logic 116 is provided that may include a relationship definition 118. Based on events and the relationship definition, multi-event relationships may be instantiated based on meta-relationships definition (which may be referred to as relationship definition 118). Actions may be triggered as provided by the relationship definition 118. Also, relationships 132, 134 may be created and stored based on received events. Additional events that match the selectors may be added to the relationship 132 or 134. Each event may be added to, or a member of, one or more relationships.

According to an example implementation, during a first phase, different events may be grouped that are received during a certain time interval (e.g., within a specified time constraint) and/or based on other constraints. Events may be received, and may be considered possible members of different candidate relationships. In one example implementation, events are collected or received, and are considered as potential members of the different relationships (or candidate relationships) that they match (or match the relationship's selectors). Events that are older than the time window, e.g., having an age greater than 1 hour (or other time window) are typically removed from a candidate relationship and are not candidates for other candidate relationships or instances.

A second phase, may begin when a set of events have been received corresponding to a minimal deterministic selector group (a minimal set that determines or defines the relationship parameters for the relationship or candidate relationship) that allows all of the relationship parameters to be defined. When this occurs, the candidate relationship is created. For example the following selectors (S1, S2, S3, S4) may correspond to events that define the following relationship parameters (V1, V2, V3):

S1-V1;
S2-V1, V2;
S3-V1, V3;
S4-V3

In this example, a minimal deterministic selector group may include a group (or subset) of selectors (one or more of S1, S2, S3, S4) that includes or defines all of the relationship parameters, V1-V3. Thus, in this example, there are (at least) three minimal deterministic selector groups, including: {S1, S3}, {52, S3} or, {52,54}. These are just three examples and others may be possible. The candidate relationship may be created by relationship manager 128 after events have been received that define the (or all of the) relationship parameters for the relationship or meta-relationship. As noted, this may occur, for example, when a set of events have been received or detected corresponding to a minimal deterministic selector group, such that all relationship parameters have been defined.

During a third phase, one or more events that meet a selector for the relationship may be added to the candidate relationship, until a minimum number of events have been received for each selector. When a minimum number of events matching each selector have been received, the candidate relationship 132 is converted by relationship manager 128 to a relationship instance 134. In response to conversion of the candidate relationship 132 to the relationship instance 134, an aggregation event may be generated, such as providing a notification of the existence of the relationship instance. After the relationship instance 134 exists (or is created based on conversion from a candidate relationship), events that match one or more selectors for the relationship may be added to the relationship instance so long as a maximum number of events (for each category or type of event) has not been reached, the event meets any additional time constraint and the relationship is not frozen or disabled. Note that the maximum number of events may be specified for each category or type of events. Thus, while a maximum number of events may be reached for a first type (or category) of event (precluding events of the first type from being added to the relationship instance), events of a second type may still be received and added to the relationship instance until a maximum number events have been reached of the second type, as specified by the relationship.

In a fourth or final phase, a maximum number of events have been reached for each type of event, and no new additional events are added nor removed to/from the relationship. If additional matching events are received, they may be added to a different relationship instance, or added to a candidate relationship, or may cause a candidate relationship to be created (if none currently exists, for example).

As described above, in an example implementation, relationships (relationship instances) are instantiated from relationship candidates. According to an example implementation, relationships (relationship instances) are instantiated as soon as all the following conditions are met, for example: 1) every relationship parameter (or relationship variable) has been instantiated or defined (this causes the candidate relationship to be created), 2) the minimum numbers of events matching each selector are met, and 3) any optional triggering condition(s) is satisfied, which may specify additional conditions to be met before creating or instantiating the relationship instance. Events will continue to be added to an instantiated relationship as long as the maximum number of events of this category is not reached, any time constraints specified by the selector are met by the event, the event is inside the time window specified by the meta-relationship, and the relationship has not been frozen. A relationship may be frozen, for example, when the maximum number of instances of each selector has been reached, or when the oldest event in the relationship is older than the present time minus the maximum window or interval set for the meta-relationship. Alternatively, a relationship may be frozen manually or programmatically (by operation of, e.g., relationship manager 128, based on a computer program or instructions). Events that cannot be added anymore to an existing relationship candidate or instance may be added to a new candidate relationship, or may cause a candidate relationship to be created if one does not currently exist, for example.

In an example implementation, event selectors (or selectors) may perform at least two functions (for example), including: 1) define relationship parameters (based on the equality condition) and thereby allow creation of candidate relationships when all relationship parameters have been defined for a relationship; and, 2) used to identify events that meet the selector constraints so that the event can be added to a candidate relationship or relationship instance.

In an example implementation, a maximum number of events may be specified for each selector. Also, it is possible to have several candidate relationships for the same set of relationship parameters (variables). Events will be added to the oldest relationship candidate. If a first type of event has reached a maximum for a relationship candidate, then a received event of the first type will be added to the next oldest relationship candidate that has not reached a maximum number of events of the first type. The oldest relationship candidate is the one containing the oldest event.

The event in the selector pools and the candidate relationships have a live time limited by the time window or time interval defined for the relationship. If no time window or interval is specified then a global interval setting may be used, as a default. Several solutions can be used to cleanup (or remove) expired candidates:

When a new event is added to a selector pool (P(s)), every member of the pool whose timestamp+interval/window is smaller than the new event timestamp are removed from the pool. A selector pool is a group of events that meet or match a particular selector.

When a new event is added to a candidate relationship every member of the candidate relationship that is older than this timestamp minus the maximum time window or maximum interval, may (or should) be removed from the pool or candidate relationship.

In one example implementation, a timer is set from the oldest event for the duration of the window. When this timer expires the oldest event is removed and the timer is reset from the timestamp of the new oldest event. Instead of using the interval set at the meta-relationship level a larger timeout can be used to accommodate the case of at event arriving with some delay in the event receiver 124.

A candidate relationship should contain a least a set of events corresponding to one of the minimal deterministic selector groups. In an example implementation, this condition may be verified whenever an event is removed from a candidate relationship. If this condition (that requires a minimal deterministic selector group for a candidate relationship) is invalidated (e.g., based on removing or deleting an event from a candidate relationship), then the candidate relationship is deleted since the relationship parameters are no longer defined.

Another example will now be described, according to an example implementation. In this example, a simple meta relationship is provided with no relationship parameters (no relationship parameters, and candidate relationships to be instantiated after receipt of an A, B and C event for the relationship), 3 selectors S1, S2 and S3, a time interval of 300 seconds (all three events for the relationship, A, B and C, must be received within 300 seconds of each other), a default minimum/maximum number of events of 1 for each selector. Event types (or event categories) may include events of type A, B or C. Different instances of the same event type may be numbered, e.g., A1, A2, A3 . . . , where events received later in time may have a higher number, e.g., event A2 may be received after event A1.

In one example, the following sequence of events may occur or may be received within a 300 second interval: A1, B1, C1, B2, C2, A2, where A1 and A2 are events that match selector S1, B1 and B2 are events that match selector S2, and events C1 and C2 are events that match selector S3. This will result in the creation of 2 candidate relationships, grouping respectively the first 3 events (A1, B1, C1) in a first candidate relationship (which is instantiated as a relationship instance) R1, and the last 3 events (A2, B2, and C2) in a second candidate relationship R2 (which is also converted to a relationship instance).

In another example, a sequence of events arrive in the same interval (within the required time interval of 300 seconds): A1, A2, B1, B2, C1, C2. This will result in the same 2 candidate relationships: When A1 comes in, this creates (or causes the creation of) a candidate relationship R1. When A2 comes in there is no more room for it in the R1 candidate relationship (since the maximum number (1) of events of type A has been reached), so another candidate relationship R2 is created for event A2. When event B1 is received, it is added to the oldest candidate relationship, R1. When B2 arrives, there is no room in R1 hence it is added to R2, . . . etc.

In a slight variation of the above sequence, each event is separated by a 90 second interval. After 300 sec (after B2 is received), candidate relationship R1 will contain A1 and B1. At that moment A1 will be removed from R1 because it is too old (older than 300 seconds from receipt of B1). After this, R1 will only contains B1 (t0+180) and R2 will becomes the oldest candidate relationship because it contains A2 (t0+90). When C1 is received (at t0+360), it is added to candidate relationship R2 and R2 is instantiated. When c2 comes in (at t0+450), it is added to R1. In the end, for this example, only candidate relationship R2 will be instantiated with (a2, b2, c1) and there will remain a candidate relationship R1 that may be instantiated if an event A3 comes in before t0+480, according to an example implementation.

In yet another example, the same meta-relationship definition is used except that there is no limit on the number of events of class (or category of events) B and C. The events may occur or arrive in sequence (for example) A1, B1, B2, C1, C2, where the events are all within a 300 sec interval will result in one relationship containing all the events. The sequence B1, C1, A1, B2, C2 will also give the same result. However, this behavior might not be appropriate where Bx and Cx events that arrive before Ax events should not be considered for inclusion in the relationship, according to an example.

According to another example, various computer events may be received and compared to one or more event selectors (selectors) for a meta-relationship (or multiple meta-relationships). The event types (or event categories) may be referred to as events A, B and C, for example. In this example, event A may be an event indicating a change of server configuration (which may be referred to as a configuration change event, or CCE), and events B and C may be events reporting resource shortage (memory resource shortage and disk space shortage, respectively, which may be referred to as memory event (ME) and disk event (DE) on the same server that the configuration change event was performed.

Example configuration change events may include reconfiguring a hard drive, adding new software, changing one or more server settings, swapping out or adding new hardware to a server, or other configuration change performed to the server. Also, by way of example, a disk event may include a disk failure, or a disk usage greater than a threshold, e.g., greater than 90% of available disk space. A memory event (ME) may include, for example, memory usage greater than a threshold, e.g., memory usage greater than 85% of available memory.

In an example implementation, the occurrence of a disk event or a memory event may be considered a problem that should be addressed or resolved, e.g., replace the failing disk, increase available memory, etc. If the disk event (DE) or memory event (ME) occurs on the same server as the configuration change event (CCE) and within a limited time interval (e.g., 1 minute) within the CCE, then this may indicate a correlation or relationship between the CCE and DE/ME, e.g., the CCE may have at least in part caused the DE/ME, for example. Therefore, a meta-relationship may be created to detect the occurrence of these related (or likely related) events. For example, once such relationship has been created, a message may be sent to the user or network administrator to identify the relationship, a description of the relationship, the events in the relationship instance, etc. This may allow the user or network administrator to determine if there is a cause/effect between the CCE and the DE and/or ME, for example, and/or fix the ME/DE and/or take steps to prevent such ME/DE in the future.

According to an example implementation described below, the disk event (DE) or memory event (ME) may be received (or may occur or may be generated) no more than 1 minute before the configuration change event (CCE) is received or generated. Thus, in other words, in this example, the ME/DE may be received after the CCE, or may be received up to 1 minute before the CCE is received. Also, the ME/DE should be received for the same server for which the CCE was performed. The server requirement and this time constraint may ensure (or at least increase the likelihood) that the ME/DE is related to the CCE, e.g., the CCE may be a likely cause of the ME or DE if these constraints are met for these events. Using relationship parameters and selectors, it is possible to express such a server constraint and a time constraint in the meta-relationship.

The following is an example (informal) meta-relationship definition (by way of illustrative example):

Meta-Relationship {

Name: "Relation between server configuration change event and memory and disk events"

Time Window (or interval): 1 hour

Relationship Parameters: $ConfigurationChangeTimestamp (this parameter identifies the time when the CCE is received by event receiver 124), $ServerName (this is the name of the server on which the CCE was performed, e.g., server A or server B). Both of these relationship parameters ($ConfigurationChangeTimestamp, $ServerName) are set by or based upon the received CCE. When both of these relationship parameters have been defined or established (instantiated) based on a received CCE, then a candidate relationship is created for this meta-relationship.

Description: sprintf("Configuration change on server % s at % d is followed by resource alerts", [$ServerName, $ConfigurationChangeTimestamp] (this provides a parameterized description of the meta-relationship to be output (e.g., displayed on a display device). In this example, the meta-relationship description is parameterized because % s allows insertion of the $ServerName parameter (e.g., either server A or server B), and % d allows insertion of the parameter $ConfigurationChangeTimestamp in the description of the meta-relationship (which is a timestamp that identifies a time of occurrence or receipt of the CCE). Sprintf may, for example, be a function to print or output the meta-relationship description in quotes, substituting the noted parameters for the % s and % d values.

Selectors: {(there are three selectors defined, in this example: 1) CONF_CHANGE_EVENT, where $A identifies an instance of this first type of event; 2) MEMORY_EVENT, where $B identifies an instance of this second type of event, and 3) DISK_EVENT, where $C is an instance of this third type of event}. The Selectors are as follows:

CONF_CHANGE_EVENT ($A) where [$A.server==$ServerName AND $A.date reception==$ConfigurationChangeTimestamp]. Note: this selector specifies a configuration change event; $A.server is the server for which the configuration change event was performed; $A.date_reception is the time/date of reception of the CCE event; the double equality of this selector operates to define both relationship parameters: $ServerName is defined or set as the $A.server or the server for which the CCE was performed, and the other relationship parameter, $ConfigurationChangeTimestamp is set or defined as $A.date_reception, which is the time/date when the CCE event was received. Thus, both relationship parameters are defined or set (instantiated) based on the CCE, according to this example.

MEMORY_EVENT ($B) where [$B.server==$ServerName AND $B.date reception>=$ConfigurationChangeTimestamp−1m]. Note, that $ServerName and $ConfigurationChangeTimestamp are the two relationship parameters and have already been defined based on the received CCE; the memory event (ME) selector here states that the received memory event satisfies the constraints of this ME selector if $B.server, which is the server for which the ME event occurred, is the same server as $ServerName. Thus, in this example, the ME event is related to the CCE (and thus part of the same relationship) only if the ME occurred on the same server as the CCE. Similarly, this selector for the ME event specifies a time constraint, where the ME occurs (or is received) no earlier than 1 minute before the time that the CCE was received or occurred. The ME being close in time to the CCE makes it more likely that the CCE and ME are related in some manner, e.g., cause/effect relationship. Therefore, if this time constraint and the server requirement (same server) are met by the ME, this may indicate or suggest that the ME may be related to the CCE, e.g., the ME may be caused by (or may be the result of) the CCE, at least in some cases.

DISK_EVENT ($C) where [$C.server==$ServerName AND $C.date reception>=$ConfigurationChangeTimestamp−1 m]. Note, this disk event (DE) specifies the same server and time constraints as the ME. Therefore, a disk event must occur on the same server as the CCE, and must be no earlier than 1 minute before the CCE to meet or satisfy this DE selector.

}
Roles: {"configuration change", "consecutive memory usage", "consecutive disk usage"}
Minimum instances: {1,0,0}. Note, this indicates that as a minimum, there must be at least 1 CCE. No minimum ME or DE events are required based on this statement. A minimum number of events is not specified for the ME or DE, since, per the additional triggering condition below, a relationship will be created or instantiated when there is a CCE that meets the CCE selector and at least one of a ME or DE that meets a selector.

Maximum instances: {1, −1, −1}. These numbers identify maximum values for each selector. The 1 indicates a maximum of 1 CCE (corresponding to the first selector); the −1, −1 on the second two entries indicate that there is no maximum for the ME and DE (which correspond to the second and third selectors).

Additional triggering condition: [instance_count(2)+instance_count(3)>0]. This statement indicates that (in addition to 1 CCE), that the number of ME events and the number of DE events are greater than zero, in order to meet this additional triggering condition. Thus, the additional triggering condition indicates that there must be at least one of a ME or DE to create or instantiate a relationship instance.

When actions: {
when $A.status==CLOSED {freeze_relationship( )}

An example sequence of events is described by the following table 1:

TABLE 1

Example Sequence of Events

| Time | Event Class | Event id | Server | status | Comment |
|---|---|---|---|---|---|
| 8:00:00 | CONF_CHANGE_EVENT | CCE_A1 | serverA | OPEN | A new candidate relationship instance $R_1$ is created with event CCE_A1 and $ConfigurationChange Timestamp = 8:00:00 $ServerName = ServerA |
| 8:05:00 | MEMORY_EVENT | ME_A1 | serverA | OPEN | ME_A1 is added to $R_1$. Since every parameters has been instantiated, the CCE has been received and the additional triggering condition (at least one ME or DE received) is satisfied, relationship $R_1$ is instantiated (or candidate relationship R1 is converted to relationship instance R1). |
| 8:10:00 | DISK_EVENT | DE_A1 | serverA | OPEN | DE_A1 is added to $R_1$ |
| 8:30:00 | MEMORY_EVENT | ME_B1 | serverB | OPEN | ME_B1 does not satisfy the selector of $R_1$. |
| 8:49:30 | DISK_EVENT | DE_B1 | serverB | OPEN | DE_B1 does not satisfy the selector of $R_1$ |
| 8:49:45 | CONF_CHANGE_EVENT | CCE_B1 | serverB | OPEN | CCE_B1 does not satisfy the selector of $R_1$. A new candidate relationship instance $R_2$ is created with $ServerName = ServerB and $ConfigurationChange Timestamp = 8:49:45. DE_B1 satisfies the server constraint and server constraint for R2 |

TABLE 1-continued

Example Sequence of Events

| Time | Event Class | Event id | Server | status | Comment |
|---|---|---|---|---|---|
| | | | | | and is added to R2 while ME_B1 is too old to satisfy the time constraint of ME selector for R2. |
| 8:50:00 | CONF_CHANGE_EVENT | CCE_A1 | serverA | CLOSED | When action of $R_1$ is triggered, $R_1$ is frozen. |
| 8:50:01 | CONF_CHANGE_EVENT | CCE_A2 | serverA | OPEN | CCE_A2 does not satisfy selector of $R_2$ A new candidate relationship instance $R_3$ is created with event CCE_A2 and $ConfigurationChange Timestamp = 8:50:01 $ServerName = ServerA |
| 9:20 | MEMORY_EVENT | ME_B2 | serverB | OPEN | ME_B2 is added to $R_2$ |
| 9:30 | | | | | ME_B1 reach the end of the 1 hour time window and is removed from its event pool, e.g., ME_B1 is discarded. |
| 9:49:30 | | | | | DE_B1 the oldest event in $R_2$ reaches the end of the 1 hour time window => $R_2$ is frozen (meaning no further events can be added to R2) |
| 9:50:01 | | | | | The oldest (and sole) event (CCE_A2) in $R_3$ reached the end of the time window (1 hour) and is removed from $R_3$ and consequently the candidate relationship $R_3$ is discarded. |

The sequence of events shown in Table 1 corresponds to the above-described meta-relationship, in which three selectors are provided, for: CONF_CHANGE_EVENT ($A) (configuration change event), MEMORY_EVENT($B) (memory event), DISK_EVENT($C) (disk event).

As shown in Table 1, at time 8:00:00, a first CCE is received for server A (event_id is CCE_A1, where A indicates server A, and 1 indicates a first CCE for server A). As noted above, the CCE will define both relationship parameters, and a new candidate relationship instance (R1) is created. $ConfigurationChangeTimestamp=8:00:00, and $ServerName=ServerA.

At 8:05:00, a ME is received for server A, with event_id=ME_A1. Since ME meets both constraints for the ME selector (same server as CCE, and no earlier than 1 minute before the CCE, or can be later/after the CCE), the ME (ME_A1) is added to R1. Since the additional triggering condition is now met, R1 is converted from a candidate relationship to a relationship instance.

At 8:10:00, a disk event (with event_id=DE_A1) is received for server A, and is added to relationship instance R1, since both the server constraint (DE occurred on server A) and the time constraint (DE is received later or after the CCE) are met for this DE_A1.

At 8:30:00, a memory event (ME_B1) is received for server B. ME_B1 does not satisfy the selector for the relationship instance R1, since ME_B1 is on a different server (server B), as compared to the CCE. ME_B1 may be added to another relationship instance for server B if/when a CCE is received on server B, assuming the time constraint for the ME is also metAt 8:49:45, at CCE is received on server B (CCE_B1). CCE_B1 does not satisfy the selector for R1, thus a new candidate relationship (R2) is created and CCE_B1 is added to R2. DE_B1 is on the same server (server B) as CCE_B1, and meets the time constraint for the DE selector for R2, and thus, DE_B1 is added to R2, and relationship R2 is instantiated. ME_B1 does not meet the time constraint for the ME selector for R2, since it arrived more than one minute before CCE_B1. Therefore, ME_B1 is not added to R2, but may be dropped or deleted or discarded.

According to an example implementation, optionally, a sliding time window may be used, e.g., 1 hour. Events older than the sliding time window or received more than the sliding time window ago (received more than one hour ago in this example) may be discarded or removed from the event pool, and thus, may no longer be part of any candidate relationship or relationship instance, and may not be added to future candidate relationships or instances. Several examples are described below, although this feature may be omitted.

At 8:50:00, at some point, such as at 8:50:00, a resulting action may be performed, based on the relationship R1 being instantiated. For example, a message may be sent to notify a user of the existence of R1. After this occurs, the relationship R1 may be frozen (no further events may be added to R1, in this example).

At 8:50:01, a CCE event (CCE_A2) is received for server A, which does not satisfy the CCE selector for R2 because R2 is for server B, and R2 already includes a CCE (CCE_B1).

Therefore, a new candidate relationship (R3) is created based upon CCE_A2, and CCE_A2 is added to R3.

At 9:20:00, a memory event for server B (ME_B2) is received and is added to relationship R2.

At 9:30, ME_B1 reaches the end of the 1 hour time window and is discarded or removed from the event pool.

At 9:49:30, DE_B1, the oldest event in R2, reaches the end of the 1 hour time window, and R2 is frozen, thereby preventing any additional events from being added to R2. This may allow only events close in time to be part of the same relationship, for example.

At 9:50:01, the oldest and sole event (CCE_A2) in R3 reaches the end of the 1 hour time window and is discarded. After being discarded, candidate relationship R3 no longer has a CCE (which is required for a candidate relationship), and therefore, R3 is discarded or deleted.

Figure 2:
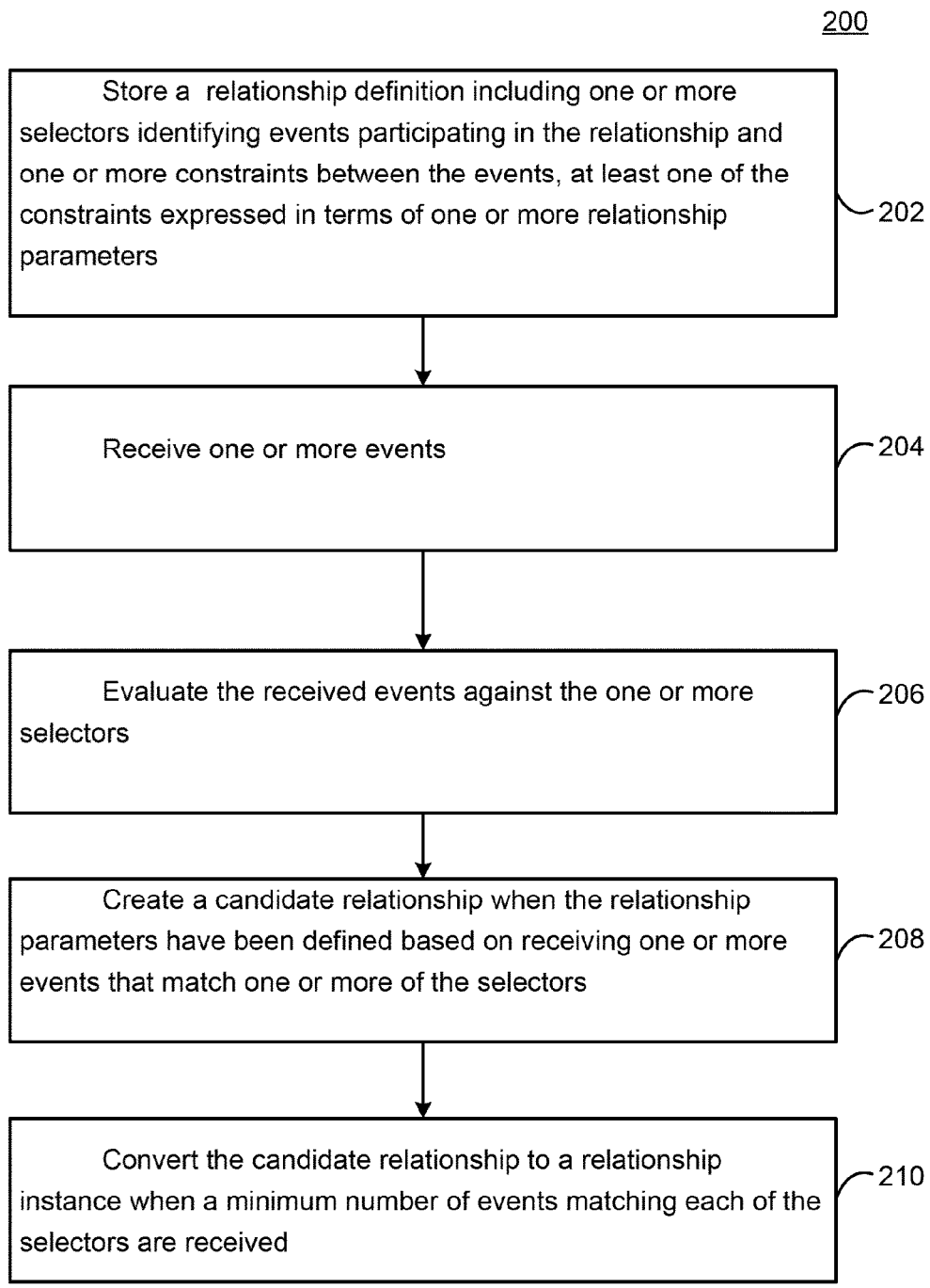
FIG. 2 is a flowchart 200 illustrating example operations 202-210 of the computer system 110 of FIG. 1.

FIG. 2 is a flowchart 200 illustrating example operations 202-210 of the computer system 110 of FIG. 1. Although the operations 202-210 of the flowchart 200 of FIG. 2 are illustrated in sequential order, for the sake of example and for clarity of explanation and illustration, it may be appreciated that many other variations and implementations of the flowchart 200 may be executed by the system 110 of FIG. 1. For example, various operations of the flowchart 200 may be executed in a partially overlapping or parallel fashion. In other examples, operations of the flowchart 200 may be executed in an order different than that shown. Additionally, operations of the flowchart 200 may be omitted, replaced by alternate operations, or supplemented with additional operations, as would be apparent to one of skill in the art.

Thus, in the example of FIG. 2, at 202, a relationship definition is stored, including one or more selectors identifying events participating in the relationship and one or more constraints between the events, at least one of the constraints expressed in terms of one or more relationship parameters. For example, a relationship definition 118 may be stored in a meta-relationship logic 116, which may be provided, for example, in any memory or storage device. The relationship definition 118 may include one or more selectors 120 identifying events 122 participating in the relationship and one or more constraints 123 between the events.

At 204, one or more events are received. For example, one or more events 122 may be received by event receiver 124.

At 206, the received events (e.g., 122) are evaluated (e.g., by event processing logic 126) against the one or more selectors 120. For example, each of the received events 122 may be compared by event processing logic 126 to the one or more selectors 120 to determine if the received event 122 meets or matches (or satisfies) the constraints between events.

At 208, a candidate relationship (e.g., 132) is created (e.g., by relationship manager 128) when the relationship parameters (e.g., 121) have been defined based on receiving one or more events (e.g., 122) that match one or more of the selectors (120).

At 210, the candidate relationship (e.g., 132) is converted (e.g., by relationship manager 128) to a relationship instance (e.g., 134) when a minimum number of events (e.g., 122) matching each of the selectors (e.g., 120) are received.

In one or more implementations, a notification may be provided indicating the existence of the candidate relationship, or the existence of the relationship instance.

In one example implementation, events that are used to define relationship parameters are added (e.g., by the relationship manager 128) to the candidate relationship. Also, additional events that match one or more of the selectors are added to the candidate relationship, up to a maximum number of events for each selector. Similarly, once a relationship has been instantiated (or converted from a candidate relationship to a relationship instance), additional events (that match a selector for the relationship) may be added to the relationship instance, up to a maximum number of events for each selector or event type.

According to an example implementation, the flow chart of FIG. 2 may further include: an event may be added to an existing relationship instance if the event matches the constraints of the existing relationship instance. Otherwise, event may be added to an existing candidate relationship if the event matches the constraints of the candidate relationship. Otherwise, the candidate relationship may be created when the relationship parameters have been defined based on receiving the event.

Figure 3:
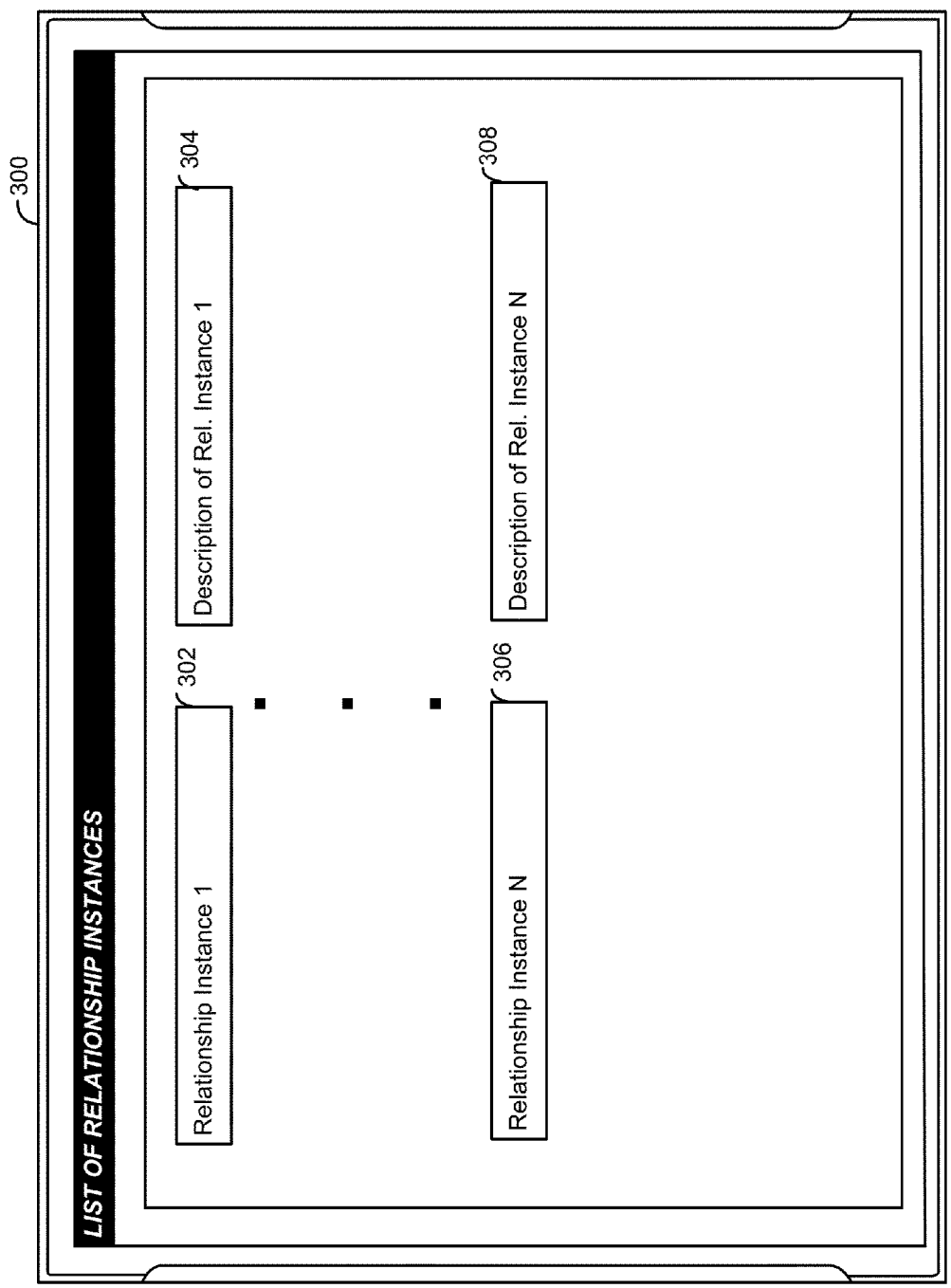
FIG. 3 is a screenshot 300 illustrating an example list of relationship instances.

FIG. 3 is a screenshot 300 illustrating an example list of relationship instances. Specifically, as shown, the screenshot 300 includes an example in which the user interface includes a graphical user interface (GUI)e, such as may be included within a browser window or other provider of graphical user interfaces. The GUI shown in FIG. 3 may include a list of relationship instances, such as, an identification of a relationship instance 1 (302), a description (304) of relationship instance 1, . . . an identification of relationship instance N (306), and a description (308) of relationship instance N. The screenshot 300, including the list of relationship instances may be viewed by user 140, or may be viewed by or displayed to any user, for example. A user may select one of the relationship instances (302 or 306) to display a second screenshot that provides more detailed information on the selected relationship instance.

Figure 4:
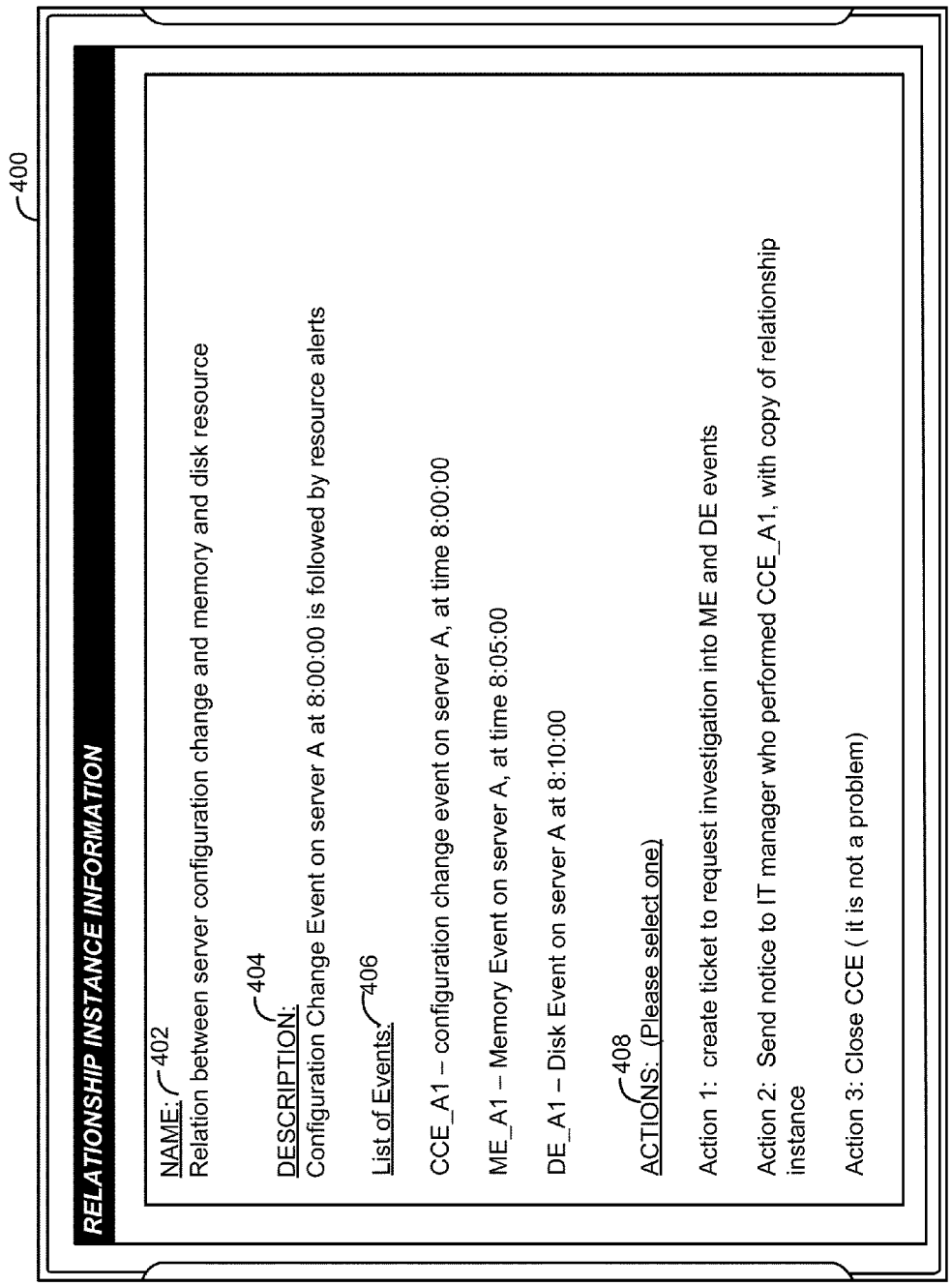
FIG. 4 is a screenshot 400 illustrating additional details of a selected relationship instance selected from the screenshot of FIG. 3.

FIG. 4 is a screenshot 400 illustrating additional details of a selected relationship instance selected from the screenshot of FIG. 3. The screenshot 400 shown in FIG. 4 includes a name 402 of a selected relationship. Further items displayed on the screenshot 400 include a description 404 of the relationship instance (where the description may be parameterized to include values of relationship parameters for this screenshot 400), a list of events 406 that have been added to or are part of the relationship instance, and a list of one or more actions 408 that may be taken in response to instantiating the relationship or being notified of the relationship instance. A user 140 (for example), may select one or more actions, such as creating a ticket to have the DE/ME problems fixed, sending a notice to the IT manager who performed the CCE_A1, and closing the CCE.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A non-transitory computer-readable storage medium comprising computer-readable instructions stored thereon that, when executed, are configured to cause a processor to at least:

store a relationship definition including one or more selectors identifying events participating in the relationship and one or more constraints between the events, at least one of the constraints expressed in terms of one or more relationship parameters;

receive one or more events;

evaluate the received events against the one or more selectors;

create a candidate relationship when the relationship parameters have been defined based on receiving one or more events that match a minimal deterministic set of the selectors;

convert the candidate relationship to a relationship instance when a minimum number of events matching each of the selectors are-received;

add an event to an existing relationship instance if the event matches the constraints of the existing relationship instance; and otherwise, add the event to an existing candidate relationship if the event matches the constraints of the candidate relationship.

2. The computer-readable storage medium of claim 1 wherein the instructions are further configured to cause the processor to provide a notification of an existence of the relationship instance.

3. The computer-readable storage medium of claim 1 wherein the instructions being configured to cause the processor to evaluate comprise instructions that are configured to cause the processor to compare each of the received events to the one or more selectors to determine if each of the received events meets or matches the constraints between the events.

4. The computer-readable storage medium of claim 1 wherein the constraints between events comprise a time constraint between events.

5. The computer-readable storage medium of claim 1 wherein the instructions are further configured to cause the processor to add additional events to the relationship instance that match the selectors, up to a maximum number of events for each selector.

6. The computer-readable storage medium of claim 1 wherein the relationship definition includes a description of the relationship, wherein the relationship description includes values of the parameters for the relationship instance.

7. A computer implemented method comprising:

storing a relationship definition including one or more selectors identifying events participating in the relationship and one or more constraints between the events, at least one of the constraints expressed in terms of one or more relationship parameters;

receiving one or more events;

evaluating the received events against the one or more selectors;

creating a candidate relationship when the relationship parameters have been defined based on receiving one or more events that match a minimal deterministic set of the selectors; and converting the candidate relationship to a relationship instance when a minimum number of events matching each of the selectors are received;

adding an event to an existing relationship instance if the event matches the constraints of the existing relationship instance; and otherwise, adding the event to an existing candidate relationship if the event matches the constraints of the candidate relationship.

8. The computer-implemented method of claim 7 and further comprising providing a notification of an existence of the relationship instance.

9. The computer-implemented method of claim 7 wherein the evaluating comprises comparing each of the received events to the one or more selectors to determine if each of the received events meets or matches the constraints between the events.

10. The computer-implemented method of claim 7 wherein the constraints between events comprise a time constraint between events.

11. The computer-implemented method of claim 7 wherein the computer-implemented method further comprises:
   adding additional events to the candidate relationship that match the selectors, up to a maximum number of events for each selector.

12. The computer-implemented method of claim 7 wherein the method further comprises adding one or more additional events to the relationship instance that match the selectors, up to a maximum number of events for each selector.

13. A computer system including instructions recorded on a computer-readable storage medium and readable by at least one processor the system comprising:
   meta-relationship logic configured to cause the at least one processor to store a relationship definition including one or more selectors identifying events participating in the relationship and one or more constraints between the events, at least one of the constraints expressed in terms of one or more relationship parameters;
   an event receiver configured to receive one or more events;
   an event processing logic configured to evaluate or compare the received events against the one or more selectors;
   a relationship manager configured to cause the at least one processor to create a candidate relationship when the relationship parameters have been defined based on receiving one or more events that match a minimal deterministic set of the selectors;
   wherein the relationship manager is further configured to cause the at least one processor to convert the candidate relationship to a relationship instance when a minimum number of events matching each of the selectors have been received; and
   wherein the relationship manager is further configured to cause the at least one processor to:
      add an event to an existing relationship instance if the event matches the constraints of the existing relationship instance; and
      otherwise, add the event to an existing candidate relationship if the event matches the constraints of the candidate relationship.

14. The computer system of claim 13 wherein the constraints between events comprise a time constraint between events.

15. The computer system of claim 13 and further comprising logic configured to cause the at least one processor to provide a notification of an existence of the relationship instance.

16. The computer system of claim 13 and further comprising logic configured to cause the at least one processor to provide a notification of an existence of the candidate relationship.

* * * * *

UNITED STATES PATENT AND TRADEMARK OFFICE
CERTIFICATE OF CORRECTION

PATENT NO. : 8,595,264 B2  
APPLICATION NO. : 13/174736  
DATED : November 26, 2013  
INVENTOR(S) : Jean-Marc Stevenne Page 1 of 1

It is certified that error appears in the above-identified patent and that said Letters Patent is hereby corrected as shown below:

On the Title Page, Item (73), under "Assignee", in column 1, line 1, delete "BM" and insert -- BMC --, therefor.

In the Claims

In column 18, line 7, in claim 1, delete "are-received;" and insert -- are received; --, therefor.
In column 18, line 10, in claim 1, delete "instance; and" and insert -- instance; --, therefor.
In column 18, line 56, in claim 7, delete "instance; and" and insert -- instance; --, therefor.
In column 20, line 12, in claim 13, delete "instance; and" and insert -- instance; --, therefor.

Signed and Sealed this  
First Day of April, 2014

Michelle K. Lee  
*Deputy Director of the United States Patent and Trademark Office*